L. B. GRAHAM.
POWER TRANSMISSION GEARING.
APPLICATION FILED JULY 23, 1913.

1,112,422.

Patented Sept. 29, 1914.
2 SHEETS—SHEET 2.

Witnesses:
Inventor:
Leslie B. Graham
By Clarence W. Taylor
Atty.

UNITED STATES PATENT OFFICE.

LESLIE B. GRAHAM, OF EAST CHICAGO, INDIANA, ASSIGNOR OF ONE-HALF TO CLARENCE W. TAYLOR, OF CHICAGO, ILLINOIS.

POWER-TRANSMISSION GEARING.

1,112,422.

Specification of Letters Patent.

Patented Sept. 29, 1914.

Application filed July 23, 1913. Serial No. 780,675.

*To all whom it may concern:*

Be it known that I, LESLIE B. GRAHAM, a citizen of the United States of America, residing at East Chicago, in the county of Lake and State of Indiana, have invented certain new and useful Improvements in Power-Transmission Mechanism, of which the following is a specification.

My invention relates to improvements in power transmission mechanism, and the objects of my improvement are, first, to provide a construction whereby to afford a positive two-wheel drive under all conditions in either direction, in motor vehicles; second, the provision of means to prevent the waste of power through the vehicle wheel which offer the least resistance; third, to produce compensating mechanism that will permit either drive wheel to rotate faster than the other in either direction; fourth, to construct what is termed a double worm and worm gear wheels in positive operative engagement therewith operable on the opposing ends of a divided shaft.

With the above and other objects in view, my invention consists in the novel features and in the novel combination and arrangement of parts hereinafter fully described, illustrated in the accompanying drawings forming a part of this specification, and particularly pointed out in the claims hereunto appended.

Figure 1:
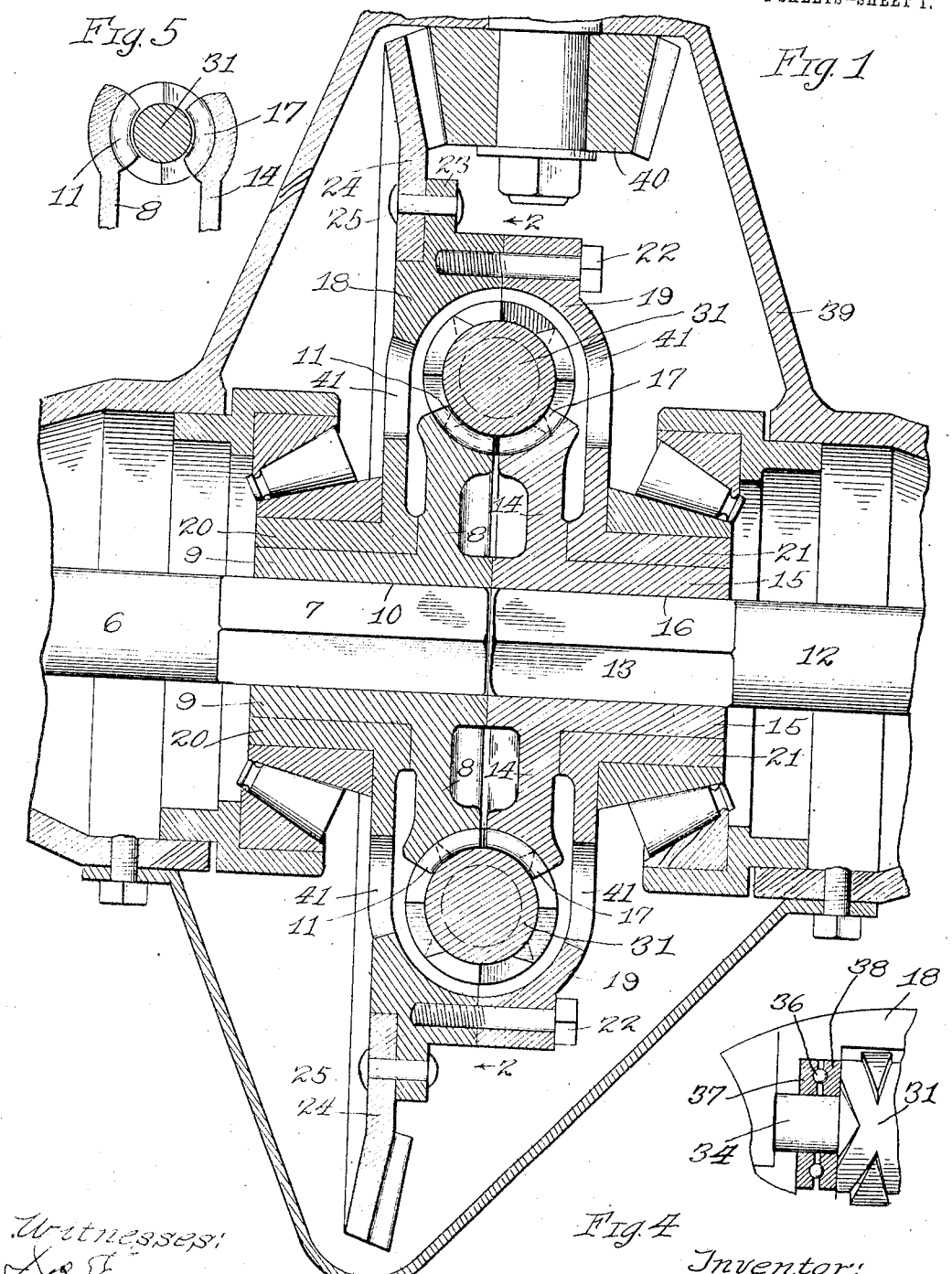
Figure 2:
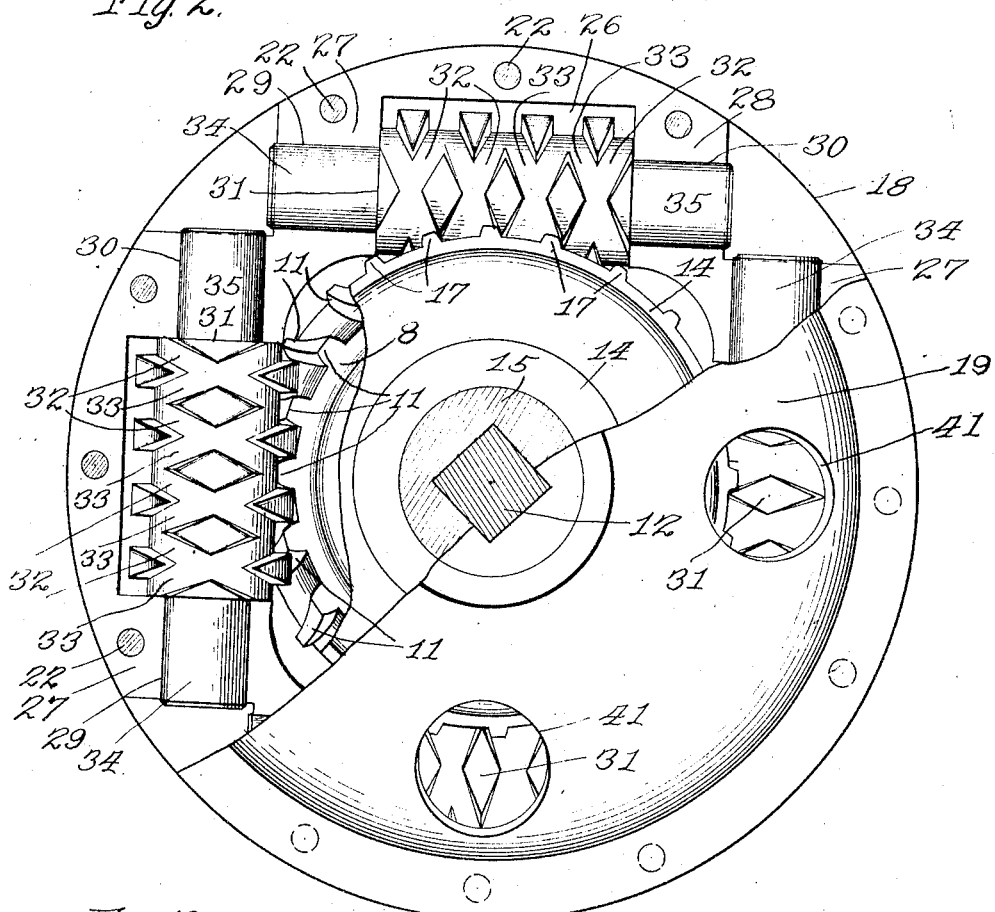
Figure 3:
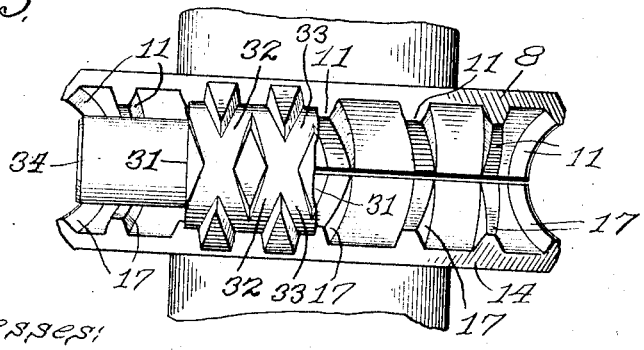

Figure 1 is a longitudinal central section of a rear axle of a motor vehicle with my invention applied thereto. Fig. 2 is a cross sectional view on line 2—2 of Fig. 1 with parts shown in elevation. Fig. 3 is an elevation of what is termed a double worm with parts of its length broken away to disclose the teeth of two rotatable worm gear wheels and their positions with reference to the double worm. Fig. 4 is a detail view of an anti-friction thrust bearing for each end of the rotatable double worm. Fig. 5 is a cross sectional view of a modified arrangement of the worm gear wheels with the double worm.

Similar numerals refer to similar parts throughout the several views.

One embodiment of my present invention as applied to a motor vehicle is described as follows:

Referring to the drawings by reference numerals, 6 designates one part of a divided shaft with its squared end 7 on which is suitably fixed a worm gear wheel 8 which has a hub 9 with squared opening 10 therethrough. The teeth 11 are suitably formed for engagement in mesh with a double worm hereinafter more fully described. The other part 12 of the divided shaft has a squared end 13 on which is suitably fixed a worm gear wheel 14 with its hub 15 with squared opening 16 therethrough. The teeth 17 are suitably formed for engagement in mesh with the said double worm. The worm wheel teeth 11 and 17 have relatively opposite pitch.

18 denotes the left part and 19 the right part of a two-piece rotatable housing or member with left hub 20 and right hub 21. The two similar parts are secured together by bolts 22. The external annular flange 23 has fixed thereto bevel gear wheel 24 by rivets 25. On the inside of each said part 18 and 19 are formed recesses 26 and solid portions 27 and 28 therebetween.

31 is a double worm, loosely journaled on its own axis, positioned to be in mesh with both worm gear wheels, 8 and 14, to rotate in bearings 29 and 30, and is carried by the rotatable housing. The double worm has formed thereon left and right grooves or threads 32 and 33, respectively, and is provided with spindles 34 and 35 rotatable in bearings 29 and 30. The grooves or threads are formed at a suitable pitch to operatively interlock with the teeth of the two worm gear wheels to move them in the direction of rotation and to permit relative rotative movement of the wheels.

In Fig. 4 an annular series of anti-friction balls or rollers 36 are positioned between plates 37 and 38 to make sensitive and responsive the double worm when compensating action of the worm is necessary.

In Fig. 5 is indicated a modified arrangement of worm gear wheels in respect to the double worm. On thing this change of position affords is a more compact construction.

The anti-friction element is disposed at each end of the worm.

39 is a non-rotatable housing, and 40 is a pinion on the engine shaft (not shown) in mesh with the usual bevel gear wheel which is fixed to the rotatable housing made up of parts 18 and 19.

41 represents openings for the purpose of lubrication.

When power is applied to the rotatable housing, the right and left thread or threads of the worm being in mesh with the teeth of both of the worm gear wheels, the housing moves the worm bodily and rotates both worm gear wheels in either direction at the same rates of speed until the speed of one worm gear wheel is greater than the other when it is free to relatively rotate faster than the other worm gear wheel. In a straight forward movement of the vehicle the right and left threads of the worm in mesh with both worm gear wheels oppose each other's tendency to rotate the worm on its own axis until the speed of one vehicle wheel is relatively greater, when the over-running or running ahead of one wheel permits the worm or worms to rotate and the housing to run ahead of the slower wheel and the faster wheel to move ahead of the housing. The relatively greater speed of one vehicle wheel is caused by the road power or the traction of such vehicle wheel while in contact with the road surface, as, for example, when turning a corner or swerving from a straight ahead course. This action of the double worm or worms can only occur when there is difference in the speed of the two vehicle wheels.

Because of the worm having reversely extending or right and left hand threads cut in its surface, the action of the teeth of each worm wheel, when no power is applied by the motor the faster worm wheel by reason of its teeth being in mesh with the double worm will cause the worm to rotate in the same direction that the faster wheel has a tendency to rotate it.

In double chain drive, the compensating mechanism is mounted on the opposing ends of the jack shaft instead of the rear axle.

Changes, variations and modifications in the details and arrangement of my invention within the scope of the claims, may be resorted to without departing from the spirit or sacrificing any of the advantages thereof. Therefore, I do not limit my invention to the exact construction and arrangement of the parts shown and described.

Having thus fully described my invention, what I claim as new, and desire to secure by Letters Patent, is—

1. In power transmission mechanism of the differential type, in combination, one or more double worms, worm wheels fixed to independent shafts, said worms each being in mesh with both of said worm wheels, and a rotatable housing carrying said double worms in a manner for bodily rotation thereof, each worm being loosely journaled on its own axis.

2. In power transmission mechanism, in combination, independent shafts, a worm wheel fixed to one end of each shaft, one or more double worms being in mesh with both of said worm wheels, a rotatable housing carrying the double worm or worms suitably for bodily rotation thereof, each worm being loosely journaled on its own axis, and means to rotate said housing.

3. In power transmission mechanism, in combination, one or more worms each having right and left threads formed circumferentially thereon and two worm wheels fixed to separate shafts, said worm wheels being suitably formed for intermeshing engagement with each of said worms, and to permit relative rotative movement of said worm wheels, a rotatable housing suitably formed to carry each of said worms for bodily rotation therewith, each worm being loosely journaled on its own axis, and means to rotate said housing.

4. In power transmission mechanism, in combination, a rotatable housing formed with worm-recesses and anti-friction worm-end bearings, one or more worms each having right and left threads formed thereon and carried by said rotatable housing, each said worm being loosely journaled on its own axis, a divided shaft, a worm wheel fixed to one end of each shaft, each said worm being in mesh with both of said worm wheels, and means to rotate said housing.

5. In power transmission mechanism, in combination, independent shafts, a worm wheel fixed to one end of each shaft, a rotatable housing formed with worm-recesses, one or more worms each having right and left threads formed thereon and rotatably carried by said rotatable housing, each said worm being in mesh with both of said worm wheels and rotatable bodily, and means to rotate said housing.

6. In power transmission mechanism, in combination, independent shafts, a worm wheel fixed to one end of each shaft, one or more worms each having right and left threads formed circumferentially thereon, each said worm being in mesh with both of said worm wheels, a rotatable housing formed with worm-recesses and anti-friction worm-end bearings, each said worm being suitably carried by said housing for bodily rotation, each said worm loosely journaled on its own axis, and means to rotate the housing.

In testimony whereof I affix my signature in presence of two witnesses.

LESLIE B. GRAHAM.

Witnesses:
C. RICHARD BETTS,
SCOTT M. HOGAN.